United States Patent [19]

Kimura et al.

[11] Patent Number: 5,180,791
[45] Date of Patent: Jan. 19, 1993

[54] METHOD OF PRODUCING CHLORINATED POLYOLEFIN

[75] Inventors: Tadao Kimura, Iwakuni; Toshihide Takahashi, Yamaguchi; Kazuo Shimizu, Iwakuni, all of Japan

[73] Assignee: Sanyo-Kokusaku Pulp Co., Ltd., Tokyo, Japan

[21] Appl. No.: 623,577

[22] Filed: Dec. 7, 1990

[30] Foreign Application Priority Data

Dec. 27, 1989 [JP] Japan .................................. 1-344658

[51] Int. Cl.$^5$ ............................................... C08F 8/22
[52] U.S. Cl. .................................. 525/358; 525/334.1
[58] Field of Search ......................................... 525/358

[56] References Cited

U.S. PATENT DOCUMENTS 4,562,224 12/1985 Busch et al. .......................... 525/358

FOREIGN PATENT DOCUMENTS

| 51-138791 | 11/1976 | Japan . |
| 54-153831 | 12/1979 | Japan . |
| 54-153853 | 12/1979 | Japan . |
| 59-68354 | 4/1984 | Japan . |
| 1-213308 | 8/1989 | Japan . |
| 709963 | 6/1954 | United Kingdom . |
| 1407159 | 9/1975 | United Kingdom . |
| 2172289 | 9/1986 | United Kingdom . |

Primary Examiner—Bernard Lipman
Attorney, Agent, or Firm—Oblon, Spivak, McClelland, Maier & Neustadt

[57] ABSTRACT

A method of producing solvent-soluble chlorinated polyolefin as resin for paint, ink, adhesion and film-forming uses comprising suspending polyolefin powder finely pulverized to a specific surface area of 300 to 20,000 cm$^2$/g into aqueous medium and conducting chlorination.

10 Claims, 1 Drawing Sheet

METHOD OF PRODUCING CHLORINATED POLYOLEFIN

BACKGROUND OF THE INVENTION

The present invention relates to a method of producing chlorinated polyolefin in aqueous medium system suitable for the film-forming uses such as paint, ink, adhesive, etc.

The chlorinated product of polyolefin by production method in aqueous medium has a feature originating from inhomogeneity of chlorination over that obtainable by chlorinating method in solution system and does not require the removing solvents technique and the measures for preventing environmental contamination brought by solvent. Hence, it is used for molded articles and modifier of resins.

The production methods of chlorinated polyolefin in aqueous medium having been proposed so far are for the uses for molding materials and improvement materials of physical properties of resins. The chlorine content is as low as 15 to 50 wt. % (Japanese Unexamined Patent Publication No. Sho 51-138791) and the nonuniform of chlorination is also utilized as a feature of chlorinating method in aqueous medium (for example, Japanese Unexamined Patent Publication No. Sho 54-153831, No. Sho 59-68354, etc.).

However, with conventional chlorinated polyolefins in aqueous suspension system, it is impossible to prepare homogeneous solutions of inexpensive solvents (for example, toluene and xylene) ordinarily used. Although a method for obtaining homogeneous solvent solution by dissolving under at elevated temperatures (Japanese Unexamined Patent Publication No. Sho 54-153853) is proposed, it is not a method enough satisfied.

SUMMARY OF THE INVENTION

The invention provides a method of producing chlorinated polyolefin in aqueous medium permitting the film-forming uses such as paint, ink, adhesive, etc., that is, a method for the production of chlorinated polyolefin in aqueous medium homogeneously dissolvable into commonly used solvents such as toluene, xylene, etc.

DETAILED DESCRIPTION OF THE INVENTION

Figure 1:
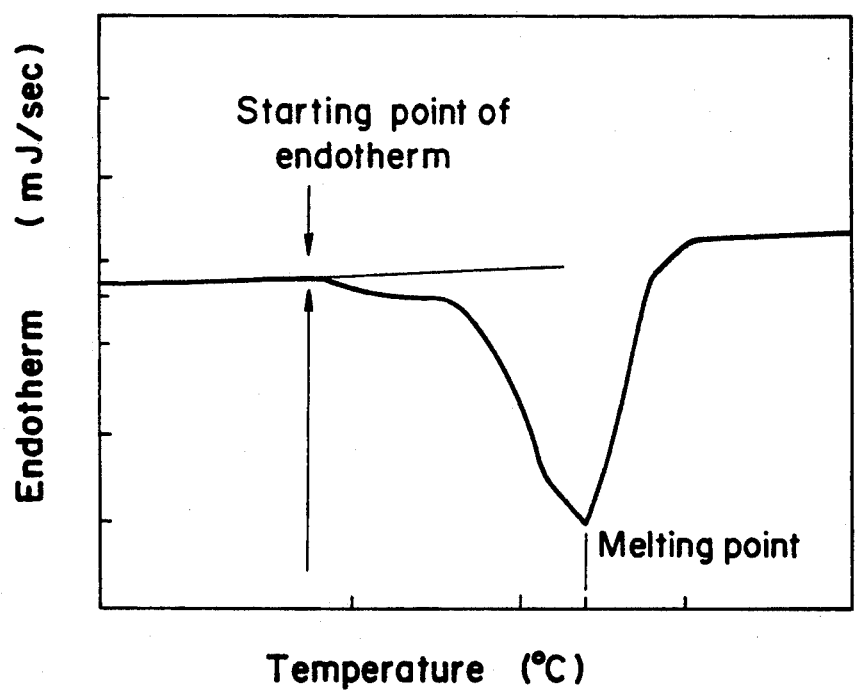
FIG. 1 is a thermograms of resin obtained through the chlorination reaction in aqueous medium, which was determined using DSC.

As a result of diligent investigations on the method of producing chlorinated polyolefin in aqueous medium homogeneously dissolvable into commonly used solvents such as toluene, xylene, etc., the inventors have found that this can be attained by 1. making the target chlorine content high to be not less than 50%, preferably not less than 60%, and
2. controlling the inhomogeneity of chlorination being a feature of chlorinated product in aqueous medium within a certain range through increased surface area of raw resin etc.

In the chlorination reaction in aqueous medium, the chlorination progresses by introducing chlorine to the powder particles of polyolefin suspended into water under the irradiation of UV rays etc. It is considered that the chlorination starts from the surface of resin particles suspended into water and then gradually the central portions of particles are chlorinated. However, such a case that the central portions of particles are not chlorinated is conceivable depending on the reaction conditions.

A high chlorine content of not less than 50% is required for permitting the homogeneous dissolution into solvent, but the progress of chlorination is hindered because of the saturated state of chlorination on the surface of resin particles. Even if highly chlorinated product may be obtained, the inhomogeneity of chlorination between surface and central portions of particles being a feature of chlorinated product in aqueous medium would be magnified resulting in no improvement in the homogeneous dissolution into solvent. As a result of extensive investigations for solving such problem, it has been found that (1) making the target chlorine content to be not less than 50%, preferably not less than 60%, and
(2) controlling the inhomogeneity of chlorination being a feature of chlorinated product in aqueous medium within a certain range, are required, concretely saying, (1) taking the penetration and the diffusion of reacting chlorine to internal portions of resin into account, raw material resin is finely pulverized within a required range of specific surface area,
(2) disintegration and pulverization are carried out in parallel during the chlorinating reaction, and
(3) specific surface area of raw material resin particles is kept large and agglomeration and thermal melt-bonding of resin particles due to the decreased softening temperature of resin during the chlorinating reaction is prevented to avoid the decreased specific surface area.

By combining three above-mentioned methods and by making the surface area where the surface of resin particles reaches the saturated chlorination degree large, it becomes possible to obtain highly chlorinated product through the chlorination in aqueous medium and to homogeneously dissolve it into solvent.

In following, these methods will be illustrated in detail.

1. Degree of fine pulverization

The fine pulverization is needed for making the specific surface area of chlorinating resin large.

There are various pulverizing methods, e.g. mechanical method, physical pulverizations (method of precipitation with poor solvent after dissolved into solvent, etc.) and the like, but the pulverization is desirable to be performed in agreement with the properties of resin to be used. Generally, resins show relative difficulty in fine pulverization depending on the molecular weight, crystallinity, etc. In consequence of experiments, if the resin has a specific surface area of not less than 300 cm$^2$/g, it is usable. Although the larger the specific surface area, the better the reactivity, the usable range is limited up to 20000 cm$^2$/g because of decreased workability.

2. Disintegration and pulverization treatments

The disintegration and the pulverization of resin particles in suspension are carried out during the chlorinating reaction from the time of about 30 to 50% chlorine content. This is made for the purpose of improving the inhomogeneity of chlorination, and it is aimed to disintegrate the agglomerates of resin particles produced during the reaction, to pulverize the particles and to peel off the chlorinated portions of particles for renewing the surfaces, thereby exposing the portions not chlorinated yet. Even if the raw material resin may be tough and difficult in mechanical pulverization, the chlorinated portions would become hard and brittle. Hence, the chlorinated portions peel off or crack relatively easily by this treatment to renew the surfaces, thereby permitting the high chlorination and improved homogeneity.

For the disintegration and pulverization treatments during the reaction, two following methods are available:

1. Interrupting the reaction, the treatment is carried out once to many times, and
2. Taking part of the suspension out of the reaction tank during the reaction, pulverization treatment is carried our continuously while circulating.

The disintegration and pulverization to be carried out during the reaction are effected by wet mechanical pulverizers, e.g. ball mill, homogenizer, high-speed mixer, centrifugate pump, etc. or any equipment if impact and shear forces can be applied. Also, in the case of treating continuously during the reaction, this treatment can be carried out even from the beginning of reaction.

(3) Reaction temperature

Since the chlorination in aqueous medium is a reaction between resin particles suspended into water and chlorine, the chlorination is considered to start from the surface of resin particles and to progress gradually to internal portions.

Moreover, since the chlorination is a substitution reaction between hydrogen and chlorine, it is said that the crystal at a point of the chlorination having occurred collapses and thus the softening temperature decreases.

The softening of resin and the occurrence of agglomerates due to the heat of reaction decrease the specific surface area of resin and increase the inhomogeneity of chlorination resulting in the difficulty in high chlorination of resin.

In the chlorination in aqueous medium, the agglomerates occur and is forwarded to lumping. A method of preventing the lumping is proposed. For example, in Japanese Unexamined Patent Publication No. Hei 1-213308, a method of preventing the lumping by varying the reaction temperature into three steps based on the melting point of resin is described. In some cases, however, it is inadequate to standardize the melting point of polymer and, in addition, for obtaining highly chlorinated product homogeneously dissolvable into solvent, the reaction temperature should be controlled more strictly to prevent the occurrence of agglomerates being a preceding state of lumping.

In order to investigate the temperature when the resin particles to agglomerate during the chlorination, a curve of exothermic change was determined using DSC (differential scanning calorimeter) [FIG. 1].

Figure 2:
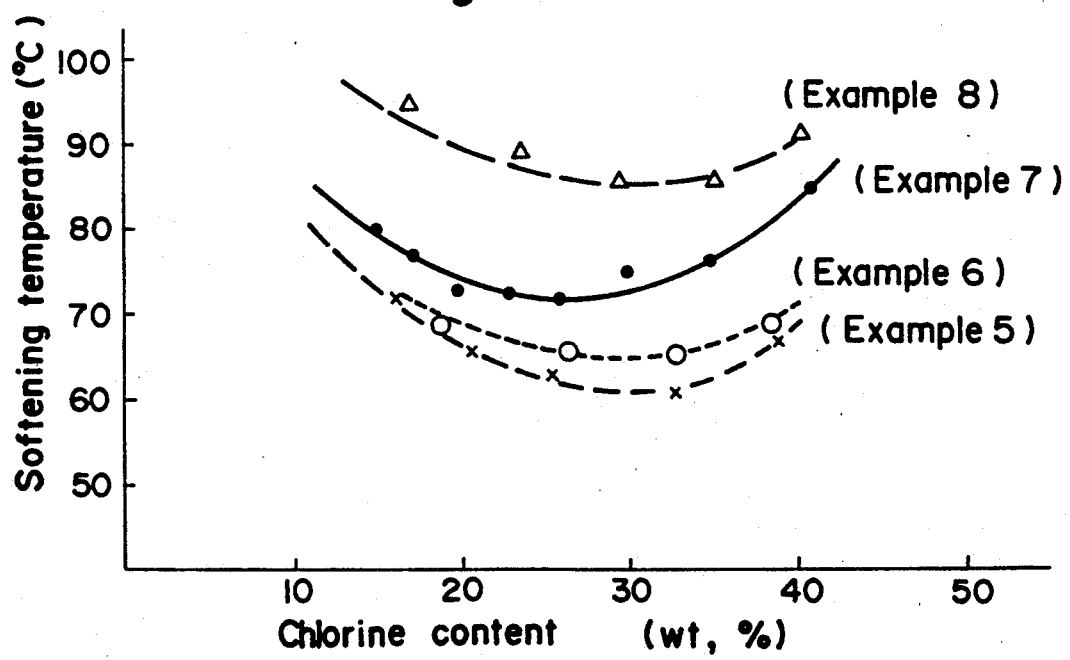
FIG. 2 is a curve of softening temperature of the same resin and shows a relationship between softening temperature and chlorine content.

Making the temperature at a point of inflection where the endoterm corresponding to chlorine content begins as a softening temperature, a curve of softening temperature versus the chlorine content of chlorinated product in aqueous medium was determined [FIG. 2].

Here, the chlorine content means an average chlorine content of sample particles.

The reaction in aqueous medium is inhomogeneous and, from the start of reaction, the chlorination progresses inhomogeneously both on the surface and at the internal portions of particles.

Therefore, if the reaction temperature is not controlled below the minimum point of softening temperature after the start of reaction until reacting average chlorine content corresponding to the minimum point of softening temperature shown in FIG. 2, there would be a potential to cause the agglomeration and meltbonding under heat from a part of the surface of resin particles at the beginning of reaction.

When the chlorination progresses over the average chlorine content corresponding to the minimum point softening temperature, the resin is chlorinated more highly as a whole and it becomes thermally stable and the softening temperature rises as well. Hence, it is unnecessary to take notice of the reaction temperature more closely than at the time of ordinary reaction. The chlorine content of resin during the reaction can be calculated or determined from the amount of hydrochloric acid in reaction liquor or from the blown-in amount of chlorine from the start of reaction. The polyolefin to be used for the invention points at polypropylene (PP) or polyethylene (PE). Moreover, the fine pulverization may be made by any method and it is only necessary to determine depending on the properties of resin to be used.

By conducting the chlorination paying attention to three points above, the solvent-soluble chlorinated produce in aqueous medium can be obtained.

In following, the invention will be illustrated based on the examples, but the invention is not confined to these.

EXAMPLE 1

In a 10-liter separable flask equipped with stirrer, reflux condenser and UV irradiation apparatus were placed 500 g of PE (MI value: 1.5) having a specific surface area (determined with flow type specific surface area measuring device made by Shimazu Seisakusho) of 6600 cm$^2$/g, a small amount of surfactant and 8 liters of water, and the mixture was warmed and stirred, to which chlorine was introduced while irradiating UV rays.

When the chlorine content reached about 40%, the reacted suspension was taken out, washed with water and then pulverized with ball mill. This was charged again into flask and the chlorination reaction was conducted until the chlorine content reached about 67.0%.

EXAMPLE 2

Under the same conditions as in Example 1, the reaction suspension was forcedly circulated with centrifugate pump without interrupting the chlorination reaction, thereby the agglomerates produced during the reaction was disintegrated. The chlorine content thus obtained was 66.8%.

EXAMPLE 3

The equipment in Example 1 was employed and polypropylene having a specific surface area of 5900 cm$^2$/g and a molecular weight of 15,000 was used, which had been prepared by dissolving PP having a specific surface area of 200 cm$^2$/g in Comparative example 2 into solvent, by depositing it with poor solvent and by pulverizing with ball mill. The chlorination and pulverization were performed under the same conditions as in Example 1.

EXAMPLE 4

Using PP having a molecular weight of 15,000, the reacted suspension was taken out at chlorine content of about 30, 40, 50, 55 and 60%. Thus pulverizing five times in total with ball mill, the reaction was conducted to the target chlorine content. Others were made same as in Example 1.

COMPARATIVE EXAMPLE 1

Using PE having a specific surface area of 220 cm$^2$/g, the reaction was conducted by the same method in Example 1. The pulverization with ball mill was not carried out.

COMPARATIVE EXAMPLE 2

By the experimental method in Example 3, PP having a specific surface area of 200 cm$^2$/g was chlorinated. The pulverization with ball mill was not carried out (PP having an average molecular weight of 15,000).

TABLE 1

| | Raw material resin | Specific surface area cm$^2$/g | Chlorine content | *Solvent solubility | Remarks |
|---|---|---|---|---|---|
| Example 1 | PE | 6600 | 67.0% | ⊙ Transparent | |
| Example 2 | PE | 6600 | 66.8 | ⊙ Transparent | |
| Example 3 | PP | 5900 | 69.2 | ⊙ Transparent | |
| Example 4 | PP | 400 | 65.7 | ○ Slight turbidity | |
| Comparative example 1 | PE | 220 | 52.0 | X Great deal of grains | |
| Comparative example 2 | PP | 200 | 32.0 | XX Many insolubles | Chlorination is impossible to target chlorine content. |

*Solvent solubility — Dissolved state of toluene solution containing 20% solids was evaluated by marks ○ and X.

As shown in Table 1, there is relative difficulty of chlorination depending on the resins (Comparative example 1 and 2), but with the same resin, the reactivity varys significantly depending on the specific surface area (Example 3 and 4).

In the chlorination reaction in aqueous medium, however, the chlorination reaction starts from the surface of particles, thus, in the domain of high chlorine content, the chlorination in internal portions becomes difficult (Comparative example 2). If carrying out the pulverization and disintegration on the way of such chlorination, the reactivity is improved to give products with high chlorination degree (Example 1, 2, 3 and 4). Particularly, in the case of pulverizing with ball mill, the reactivity is improved drastically. It is considered that, since cracking and peeling-off of chlorinated portions take place by the pulverization treatment to expose non-chlorinated portions, the reactivity is improved (Example 1, 3 and 4).

If the suspension is forcedly circulated during the reaction by using centrifugate pump, the disintegration of agglomerates and lumps of particles occurring during the reaction are effected to raise also the reactivity (Example 2).

EXAMPLE 5

Into a 10-liter separable flask equipped with stirrer, UV irradiation apparatus and reflux condenser was charged a slurry of 500 g of resin (MI value:80), 8 liters of water and small amount of surfactant, and the mixture was warmed to 50° C. Chlorine was introduced to this at a rate of 500 g/H while irradiating UV rays and, at presumably 35% chlorine content corresponding to a point showing the minimum temperature of softening curve in FIG. 2, the reaction temperature was kept at 50° C. Thereafter, the temperature was raised to 90° C. at a rate of about 20° C./H, which was kept to obtain a chlorinated product with 67.5% or more chlorine content. During the reaction, forced circulation was carried out with centrifugate pump for the disintegration and pulverization. The specific surface area thus obtained was 500 cm$^2$/g.

EXAMPLE 6

The reaction was conducted similarly to Example 5, except that the resin used was PE with a MI value of 20.

EXAMPLE 7

The reaction was conducted similarly to Example 5, except that the resin used was PE with a MI value of 1.5.

However, the start temperature of chlorination reaction was set at 60° C. from the minimum temperature of softening temperature curve in FIG. 2.

EXAMPLE 8

The reaction was conducted similarly to Example 5, except that the resin used was PP with an average molecular weight of 4,000.

However, the start temperature of chlorination reaction was set at 70° C. from the minimum temperature of softening temperature curve in FIG. 2.

COMPARATIVE EXMAPLE 3

The reaction was conducted similarly to Example 5, except that the resin used was PE with a MI value of 1.5.

However, the start temperature of chlorination reaction was set at 75° C. being lower than the melting point and higher than the minimum softening temperature.

COMPARATIVE EXAMPLE 4

The reaction was conducted similarly to Example 5, except that the resin used was PP with an average molecular weight of 4,000.

However, the start temperature of chlorination reaction was set at 90° C. being lower than the melting point and higher than the minimum softening temperature.

TABLE 2

Initial reaction temperature and solvent solubility of chlorinated products

| Example<br>Comparative example No. | Example<br>5 | Example<br>6 | Example<br>7 | Example<br>8 | Comparative<br>example<br>3 | Comparative<br>example<br>4 |
|---|---|---|---|---|---|---|
| Resin | PE | PE | PE | PP | PE | PP |
| MI or MW | 80 | 20 | 1.5 | Av. molecular weight 4000 | 1.5 | Av. molecular weight 4000 |
| Melting point °C. (DSC) | 108 | 110 | 114 | 135 | 114 | 135 |
| Min. softening temperature caused by chlorination °C. | 61 | 65 | 72 | 85 | 72 | 85 |
| Initial chlorinating reaction temperature °C. | 50 | 50 | 60 | 70 | 75 | 90 |
| Difference between melting point and initial reaction temperature °C. | 58 | 60 | 54 | 65 | 39 | 45 |
| Final chlorine content | 67.5 | 66.3 | 68.2 | 69.7 | 69.5 | 65.3 |
| Solubility into solvent | ⊙ | ⊙ | ⊙ | ⊙ | Small amount of insoluble grains<br>Δ<br>slight turbidity | X<br>Many insoluble grains |
| Remarks | — | — | — | — | Occurrence of agglomerates when presumably 15-20% chlorine content | Occurrence of agglomerates when presumably 15-20% chlorine content |

It has become clear that, by finely pulverizing the raw material of chlorinating polyolefin to a specific surface area of 300 to 20,000 cm²/g, by carrying out in parallel the disintegration and pulverization of raw material resin once or more than once or continuously on the way of reaction, thus highly chlorinating to not less than 50%, and further by controlling the temperature at the beginning of reaction to not higher than the minimum point of softening temperature, solvent-soluble chlorinated polyolefin as resin for paint, ink, adhesion and film-forming uses can be produced, leading to the completion of the invention.

What is claimed is:

1. A method for producing solvent-soluble chlorinated polyolefin as resin for paint, ink, adhesion and film-forming uses comprising suspending polyolefin powder finely pulverized to a specific surface area of 300 to 20,000 cm²/g into an aqueous medium and chlorinating said polyolefin powder.

2. The method of producing chlorinated polyolefin according to claim 1, wherein the finely pulverized polyolefin powder is subjected to disintegration and pulverization treatments of polyolefin particles during the chlorinating reaction, said treatments being carried out in parallel one or more times or continuously until the chlorinating reaction is completed.

3. The method of producing chlorinated polyolefin according to claim 1 or 2, wherein the reaction temperature is controlled to not higher than the minimum value of softening temperature of chlorinated polyolefin until the chlorination reaches a chlorine content at which the chlorinated polyolefin has said minimum value of softening temperature.

4. The method of producing chlorinated polyolefin according to any one of claims 1 or 2, wherein chlorination is carried out until the chlorine content of the chlorinated polyolefin is not less than 50% by weight.

5. The method of producing chlorinated polyolefin according to any one of claims 1 or 2, wherein the polyolefin is polyethylene or polypropylene.

6. The method of producing polyolefin according to any one of claims 1 or 2, wherein the reaction temperature is controlled to not higher than the minimum value of softening temperature of chlorinated polyolefin until the chlorination reaches a chlorine content at which the chlorinated polyolefin has said minimum value of softening temperature, the chlorine content of the chlorinated polyolefin being not less than 50% by weight.

7. The method of producing chlorinated polyolefin according to claim 6, wherein the polyolefin is polyethylene or polypropylene.

8. The method of producing chlorinated polyolefin according to claim 3, wherein the polyolefin is polyethylene or polypropylene.

9. The method of producing chlorinated polyolefin according to any one of claims 1 or 2, wherein chlorination is carried out until the chlorine content of the chlorinated polyolefin is not less than 55% by weight.

10. The method of producing polyolefin according to any one of claims 1 or 2, wherein the reaction temperature is controlled to not higher than the minimum value of softening temperature of chlorinated polyolefin until the chlorination reaches a chlorine content at which the chlorinated polyolefin has said minimum value of softening temperature, the chlorine content of the chlorinated polyolefin being not less than 55% by weight.

* * * * *